(12) United States Patent
Ackley et al.

(10) Patent No.: US 10,300,389 B2
(45) Date of Patent: May 28, 2019

(54) AUGMENTED REALITY (AR) GAMING SYSTEM WITH SIGHT LINES TO OTHER PLAYERS

(71) Applicant: DISNEY ENTERPRISES, INC., Burbank, CA (US)

(72) Inventors: Jonathan Ackley, Glendale, CA (US); Lanny S. Smoot, Thousand Oaks, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 64 days.

(21) Appl. No.: 15/679,257

(22) Filed: Aug. 17, 2017

(65) Prior Publication Data
US 2019/0054379 A1 Feb. 21, 2019

(51) Int. Cl.
A63F 13/25 (2014.01)
A63F 13/65 (2014.01)
G06T 19/00 (2011.01)
A63F 13/213 (2014.01)
A63F 13/843 (2014.01)
H04N 13/341 (2018.01)

(52) U.S. Cl.
CPC ............ *A63F 13/65* (2014.09); *A63F 13/213* (2014.09); *A63F 13/25* (2014.09); *A63F 13/843* (2014.09); *G06T 19/006* (2013.01); *H04N 13/341* (2018.05); *A63F 2300/69* (2013.01); *A63F 2300/8082* (2013.01); *A63F 2300/8088* (2013.01); *H04N 2213/008* (2013.01)

(58) Field of Classification Search
None
See application file for complete search history.

(56) References Cited

U.S. PATENT DOCUMENTS 5,421,589 A * 6/1995 Monroe .................. A63F 13/08
345/9
9,703,369 B1 * 7/2017 Mullen ...................... G06F 3/01
(Continued)

OTHER PUBLICATIONS

"Using an Eye-Tracking System to Improve Camera Motions and Depth-of-Field Blur Effects in Virtual Environments" by Sebastien Hillaire et al. published in IEEE Virtual Reality 2008.*

*Primary Examiner* — James S. McClellan
*Assistant Examiner* — Peter J Iannuzzi
(74) *Attorney, Agent, or Firm* — Marsh Fischmann & Breyfogle LLP; Kent A. Lembke

(57) ABSTRACT

An augmented reality (AR) gaming system of the present description includes 3D eyewear for each player that allows the player wearing the 3D eyewear to view the surrounding physical space. The 3D eyewear in conjunction with operation of a 3D display assembly of the AR gaming system allows the player to see other players while they also perceive 3D augmentation content that is rendered based on that particular player's tracked location. For example, the 3D augmentation content may include a game object that moves about the virtual gaming environment/space during the game as two (or more) players play the game such as by interacting with the game object via movement of their hand(s) with the movement/location being tracked. The AR gaming system generates the 3D augmentation content to correctly represent the present location of the game object relative to their location and view point.

36 Claims, 7 Drawing Sheets

(56) References Cited

U.S. PATENT DOCUMENTS

2005/0017454 A1* 1/2005 Endo ..................... G06F 3/016
                                                     273/317.1
2018/0103917 A1* 4/2018 Kim ..................... G02B 27/017

* cited by examiner

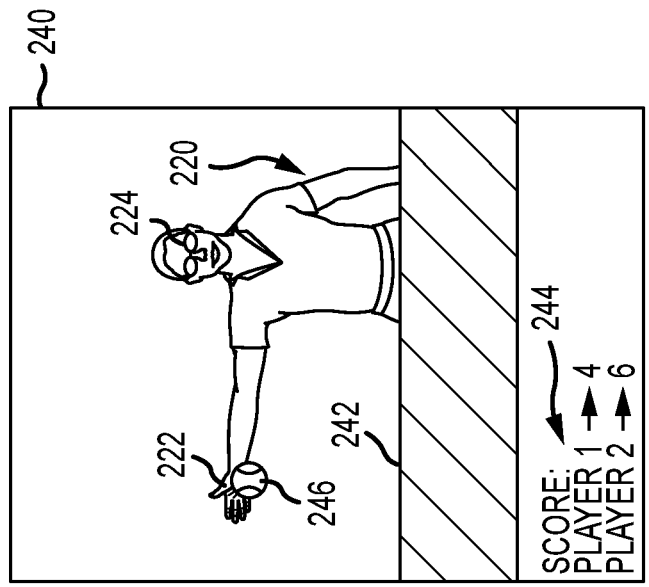
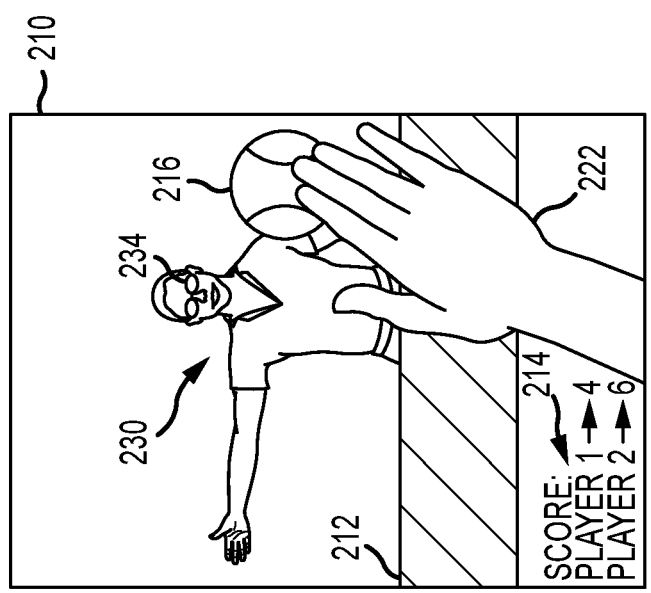

AUGMENTED REALITY (AR) GAMING SYSTEM WITH SIGHT LINES TO OTHER PLAYERS

BACKGROUND

1. Field of the Description

The present description relates, in general, to augmented reality (AR) systems and their uses to generate unique gaming experiences, and, more particularly, to systems and methods for providing a two (or more) player 3D gaming experience in which the two (or more) players can compete against each other or play with each other in the AR world or environment while being able to see their opponent or co-player (or opponents or co-players).

2. Relevant Background

Virtual reality (VR) is a computer technology that uses VR headsets, sometimes in combination with physical spaces or multi-projected environments, to generate realistic images, sounds, and other sensations that simulate a user's physical presence in a virtual or imaginary environment. A person using virtual reality equipment is able to "look around" the artificial world, and, with high quality VR technologies, to move about in it and interact with virtual features in the VR space. VR headsets are head-mounted goggles with a screen in front of the eyes, and VR programs may include audio and sounds through speakers or headphones. The gaming industry has been quick to adopt VR technologies and to create VR-based gaming systems, and these include haptic systems providing physical feedback to the player as they interact with their VR gaming environment.

One ongoing challenge for creators of games and systems is how best to allow the participants to view another participant in the VR gaming space. For example, in a VR gaming environment, it can be difficult to allow two players to compete against each other or collaboratively play together so that each player can view 3D content used to augment the real world while also perceiving the other player. While the interactive medium (e.g., console/video screen-based video games, PC games, head-mounted displays providing the VR viewing, and the like) is presently excellent at providing experiences that are often limited or even prevented by real-world physics, it remains very difficult to create convincing interactive multi-player fantasy worlds with present VR technologies. Gamers playing with or against each other in a VR world typically must deal with challenges or problems with the fantasy world's veracity that is created by frame-rate issues, game latency, and unconvincing artwork. It is particularly difficult to generate in real time high quality human characters representing the other human players in the VR environment.

Hence, there remains a need for a system that can provide a 3D virtual world, which may be used for gaming or other applications, in which two or more human players or users can participate in an interactive or collaborative manner. It is preferable that the new system allows each player to be able to "see" or perceive the other players in real time.

SUMMARY

With the above challenges of VR gaming systems in mind, the inventors recognized that a better solution would be to design a new system that is configured to allow human players (or users or participants) to really see each other such as by providing sight lines between the players. Concurrently, the system creates a convincing illusion of the fantasy or gaming objects, and this is achieved by displaying 3D content to each player that is suited to their location (e.g., presently tracked location of their head or eyes).

The new system may be thought of as an augmented reality (AR) gaming system (that may be used for non-gaming applications, too). In general, AR is a live direct or indirect view of a physical, real-world environment whose elements are augmented by computer-generated sensory input such as sound, video, and graphics. AR technology typically is used to enhance a participant's (or player's in the gaming environment) current perception of reality, whereas, in contrast, virtual reality (VR) technology replaces the real world with a simulated one. Augmentation techniques are typically performed in real time and in semantic context with environmental elements, such as overlaying supplemental information like scores over a live video feed of a sporting event.

In this regard, the AR gaming system of the present description includes 3D eyewear for each player that allows the player wearing the 3D eyewear to view the surrounding physical space that may include one or more other players (also wearing 3D eyewear). The 3D eyewear in conjunction with operation of a 3D display assembly and other components of the AR gaming system allows the player to see the other player while they also perceive 3D augmentation content (such as 3D gaming objects) that is rendered in real time based on that particular player's tracked location (e.g., location of their head or eyes) and a present state of the game running on the AR gaming system. For example, the 3D augmentation content may include a game object (e.g., a tennis or other ball) that moves about the virtual gaming environment/space during the game as two (or more) players play the game such as by interacting with the game object via movement of their hand(s), another body part, or a held/worn game element and with the movement/location being tracked. The AR gaming system renders/generates the 3D augmentation content to correctly represent the present location of the game object relative to their location and view point (as well as the correct size, speed, and direction of travel of the game object for each player).

More particularly, a system for providing an augmented reality (AR) experience for two or more participants (such as two 3D video game players). The system includes a first player space and a second player space. The system also includes first 3D eyewear wearable by a first participant in the first player space and second 3D eyewear wearable by a second participant in the second player space. The system further includes a 3D display assembly positioned between the first and second player spaces. During operations, light from the second player space passes through the 3D display assembly and the first 3D eyewear whereby the first participant is able to view the second participant. Also, during system operations, light from the first player space passes through the 3D display assembly and the second 3D eyewear whereby the second participant is able to view the first participant. Further, the 3D display assembly projects 3D content generated for the first player from a first side into the first player space and projects 3D content generated for the second player from a second side into the second player space.

The system may also include a display controller, a first tracking mechanism, and a second tracking mechanism. Then, during system operations, the first tracking mechanism collects location information for the first participant in the first space and the second tracking mechanism collects location information for the second participant in the second space. Then, the display controller generates the 3D content generated for the first player based on the collected location information for the first participant and generates the 3D content generated for the second player based on the collected location information for the second participant. The display controller may process the collected location information to determine eye locations for the first and second participants, and the 3D content can then be generated by placing virtual cameras for rendering at the determined eye locations. In practice, the 3D content generated for the first player differs from the 3D content generated for the second player as it is generated with cameras at different locations and/or associated with differing viewpoints in the virtual world. In game play, the 3D content generated for the first and second players often will include an object appearing to move between the first and second player spaces.

In some embodiments of the system, the 3D display assembly includes: (a) a projection screen positioned between the first and second player spaces with a first side facing the first player space and a second side facing the second player space; (b) a first 3D projector projecting the 3D content generated for the first player upon the first side of the projection screen; and (c) a second 3D projector projecting the 3D content generated for the second player upon the second side of the projection screen. The first and second 3D eyewear each includes 3D shutter glasses. Also, the first and second 3D projectors are operated with time multiplexing relative to each other and to alternate between displaying left and right eye images and with synchronized operations with the 3D shutter glasses to deliver the left and right eye images to left and right eyes of the first and second participants. In some cases, the projection screen includes a scrim or a variable translucency LCD film. The projection screen may instead include a first scrim proximate to the first player space, a second scrim proximate to the second player space, and a light polarization sheet with a first polarization sandwiched between the first and second scrims. Then, the first and second 3D projectors each further includes a polarizing filter in front of an output whereby light from the output has a second polarization opposite to the first polarization so as to control blow-by.

In other embodiments, the 3D display assembly includes: (a) a projection screen positioned between the first and second player spaces with a first side facing the first player space and a second side facing the second player space; (b) a first notch filter 3D projector projecting the 3D content generated for the first player upon the first side of the projection screen; and (c) a second notch filter 3D projector projecting the 3D content generated for the second player upon the second side of the projection screen. The first and second 3D eyewear each may include RGB notch filters corresponding to output light from the first and second notch filter 3D projectors, respectively.

In some useful implementations, the 3D display assembly includes: (a) a projection screen positioned between the first and second player spaces with a first side facing the first player space and a second side facing the second player space (e.g., the projection screen comprises an LCD display panel without a backlight sandwiched between first and second variable transparency films providing the first and second sides, respectively); (b) a first illuminator projecting white light onto the second side of the projection screen when the 3D content generated for the first player is being displayed on the LCD display panel and the second variable transparency film is operated to be translucent-to-opaque; and (c) a second illuminator projecting white light onto the first side of the projection screen when the 3D content generated for the second player is being displayed on the LCD display panel and the first variable transparency film is operated to be translucent-to-opaque. In such systems, the first and second 3D eyewear each includes 3D shutter glasses. Also, the first and second illuminators are operated with time multiplexing relative to each other and with synchronized operations with the 3D shutter glasses to deliver left and right eye images to left and right eyes of the first and second participants.

In still another embodiment, the 3D display assembly includes: (a) a beamsplitter positioned at an angle between the first and second player spaces with a first side facing the first player space and a second side facing the second player space; (b) a first display surface displaying the 3D content generated for the first player upon the first side of the beamsplitter; and (c) a second display surface displaying the 3D content generated for the second player upon the second side of the beamsplitter.

BRIEF DESCRIPTION OF THE DRAWINGS

FIGS. 2A and 2B illustrate concurrent views of an AR gaming environment provided to first and second players, respectively, by an AR gaming system of the present description (such as the system of FIG. 1);

FIG. 6 is a side schematic, similar to FIG. 5, of an AR gaming system is configured to control or defeat blow-by.

DETAILED DESCRIPTION

Figure 1:
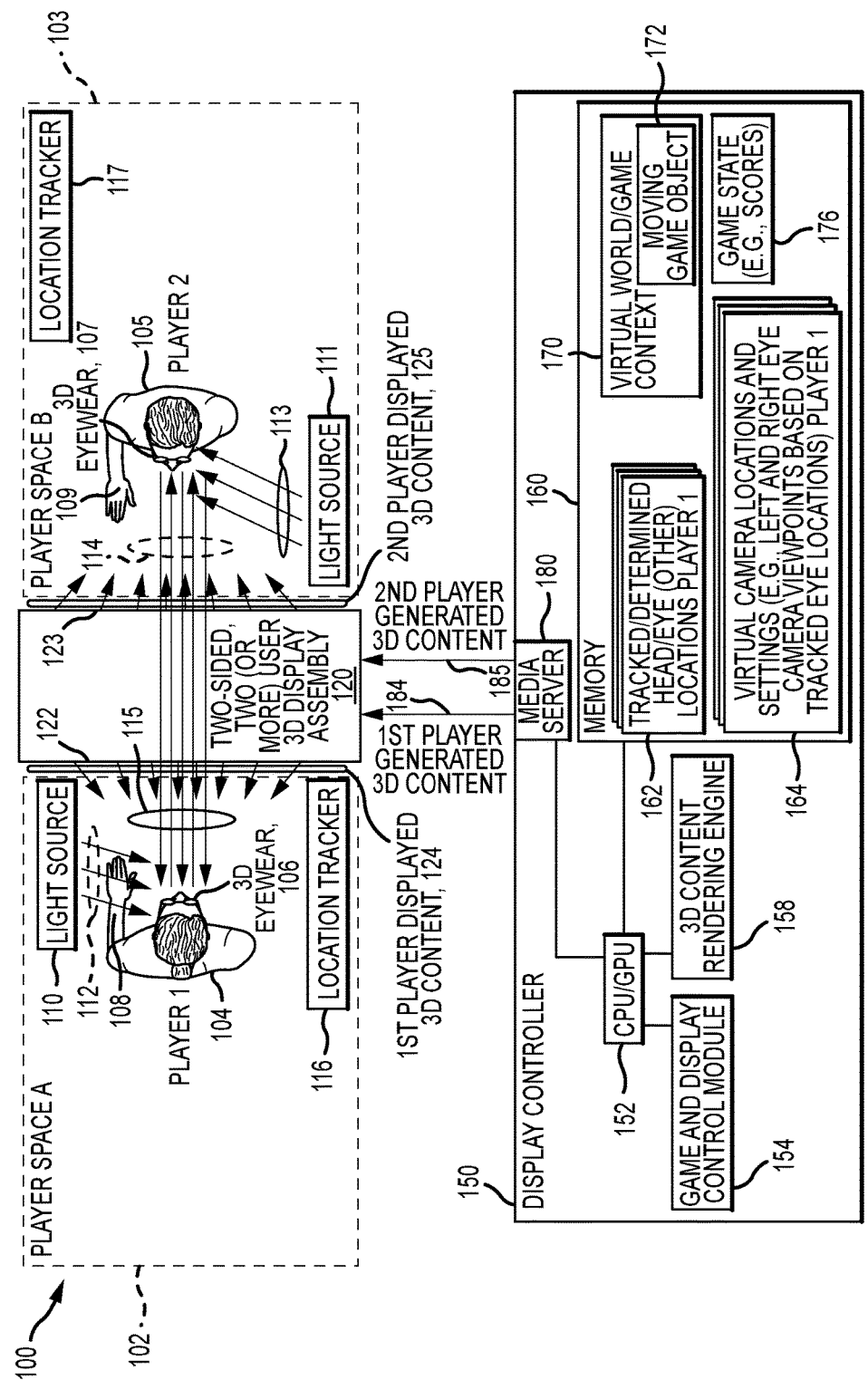
FIG. 1 is a functional block diagram of a system for providing different 3D content (or views into a virtual gaming environment or virtual world) to two users of the system (or game players) while also providing each viewer a line of sight to see the other user/player.

Briefly, the present description teaches a new augmented reality (AR) gaming system that generates 3D content for two or more players each wearing 3D eyewear. The 3D content is unique for each player and is rendered to suit their tracked locations (or locations of their heads and/or eyes) relative to a 3D display assembly such as within two player/viewing spaces on opposite sides of the 3D display assembly. The 3D display assembly is designed to provide a line of sight between the two player/viewing spaces so that each player can see the other players (e.g., see their opponents), and, in this way, each player concurrently sees the physical world about them including other players and 3D game content that augments the physical world.

The AR gaming system allows multiple players to look directly at each other, while participating in a physical but computer-augmented multi-player game. In some embodiments, players stand opposite each other in an arena space. In between players or player teams are projection surfaces of the 3D display assembly such as a scrim. A scrim is substantially transparent, but it presents enough optical diffusion such that video projectors in the 3D display assembly can be used to produce images (3D content rendered for each player based on their tracked location in the arena space) on opposite sides of the scrim. In other words, the scrim is transparent providing a line of sight between player spaces except where the projectors display bright objects (with, typically, one 3D projector (or projector assembly) being provided per player to project that player-specific content). In this way, the players see each other through the scrim as well as virtual objects.

To increase the veracity of the virtual gaming environment, the projected objects are rendered in 3D. With the AR gaming system, it is possible to have a different 3D render of the virtual environment for each player. The render displayed to each player (e.g., visible to each player via their 3D eyewear) is specific to and appropriate for only that player (i.e., a player sees only the imagery appropriate for his or her view). All the views for all of the players are coordinated to represent a virtual world that is consistent with the real world of the players (physical set/scene provided in the arena space).

Prior to turning to particular implementations, it may be useful to provide an example of how the AR gaming system may be used in practice. A game implemented by the AR gaming system may be configured to allow two players to play virtual catch. To provide the 3D visuals, the players wear 3D eyewear (such as powered 3D shutter glasses or the like). The media server/display controller or 3D display assembly is adapted to synchronize via time multiplexing the display of each player's left and right eye images (on the scrim or the like) with the opening of the left and right eye shutters of their glasses (and to prevent the viewing of time slices for each player's shutter glasses to overlap). In this way, a player sees 3D imagery the other player(s) cannot see.

In this example, the players interact with the game system through a motion sensor similar to a Microsoft Kinect™ controller. In an example game, Player 1 has the ball, and he makes a throwing motion toward Player 2 (with Player 2 being visible through the scrim or other 3D display assembly component to Player 1). The game system senses Player 1's user input and reacts (e.g., generates new 3D content changing movement of the ball (3D game object) and imagery of the ball and its location and velocity and direction of movement). From Player 1's perspective, the virtual ball seems to travel away from him. Meanwhile, at the opposite side of the arena (and other side of the 3D display assembly (including the scrim or the like)), Player 2 watches Player 1 wind up and throw as Player 2 can see Player 1 through the 3D display assembly (e.g., the scrim or the like is translucent to transparent to light illuminating Player 1).

For Player 2, the virtual ball is rendered so as to seem to be coming towards him. Player 2 perceives no lag in the motion of Player 1 because he views Player 1 with his own eyes. There is no intermediary machine to add latency and, thereby, reduce the veracity of the player's existence in the virtual world. Player 2 can then attempt to "catch" the ball by being in the right place in the gaming space and by performing the correct gesture (e.g., moving their hand(s) into the virtual ball's flight path), as arbitrated by the gaming system (e.g., with a game control module or game software). Player 2 then throws the ball back toward Player 1. For Player 2, the virtual ball now seems to travel away from them (getting smaller in size as it moves through the virtual world toward visible Player 1) while Player 1 concurrently sees Player 2 throwing the ball and sees the ball growing in size as it approaches him.

FIG. 1 illustrates a functional block diagram of an augmented reality (AR) gaming system 100 of the present description showing its use to deliver unique 3D content or differing views of a 3D game environment to two users or players 104, 105 based on their present location. Only two players 104, 105 are shown for ease of explanation, but the system 100 may be used by three, four, or more users/players with each being able to view different 3D content rendered based on their tracked location. Further, the system 100 is described as a "gaming" system as AR gaming is one likely use of the system 100, but it is also expected to be used for other interactive 3D applications including collaborative design and work applications.

As shown, the system 100 includes a first player space 102 and a second player space 103, and the two players 104, 105 are positioned inside these two viewing spaces 102, 103. The system 100 includes a 3D display assembly 120 that can be considered to be a two-sided and two (or more) user device as it is configured to be operated to display first player 3D content 124 to the first player 104 in the first player space 102 via a first "side" 122 (with the term side intended to be construed broadly to mean video or other 3D output (e.g., left and right eye light or the like) is output generally in a first general direction from the assembly 120 or from a first side 122). Concurrently or nearly so (e.g., with high frequency switching or time multiplexing), the 3D display assembly 120 is operated to display second player 3D content 125 to the second player 105 in the second player space 103 via a second side 123 (opposite the first side 122). Each of the players 104, 105 wears 3D eyewear 106, 107 selected to suit the light/content 124, 125 output by the 3D display assembly 120 so that the players 104, 105 receive left eye light/content in their left eye and right eye light/content in their right eye to perceive 3D imagery (e.g., video associated with a 3D game in which the players 104, 105 are the two participants).

As explained below, the first player displayed 3D content 124 differs from the second player displayed 3D content 125 because it is rendered using virtual cameras (e.g., left and right eye cameras) positioned or oriented based on the two different locations of the eyes of the two players 104, 105. The players' eye locations, as can be seen in FIG. 1, differ as the first player 104 is in the first player space 102 facing a first side 122 of the display assembly 120 while the second player 105 is in the second player space 103 facing a second side 123 of the display assembly 120. The system 100 is adapted to generate 3D content based on these two differing viewpoints in a virtual gaming environment. A first tracker mechanism 116 is provided in the first player space 102 for tracking the location of the first player 104 (e.g., their head and/or the location of their eyewear 106) to allow the location of their left and right eyes to be tracked/determined during use of the system 100. This data is transmitted to the display controller 150 for storing in memory 160 as shown at 162. Similarly, a second tracker mechanism 117 is provided in the second player space 103 for tracking the location of the second player 105 (e.g., their head and/or the location of their eyewear 107) to allow the location of their left and right eyes to be tracked/determined during the use of the system 100. This data is also transmitted to the display controller 150 for storage in memory 160 as shown at 162.

The trackers 116, 117 may take a wide variety of forms known in the art such as a Kinect™ device from Microsoft Corporation, a Vicon motion capture system from Vicon Motion Systems Ltd., or other devices and/or software from these or other distributers/manufacturers that functions to track the location of the players 104, 105 (or their eyewear 106, 107 or eye locations). To provide the participants with a proper view of the virtual world and/or to position 3D objects relative to the physical world objects, the AR gaming (and other) system 100 may also (or instead) use one or more of the following tracking technologies: digital cameras and/or other optical sensors, accelerometers, GPS, gyroscopes, solid state compasses, RFID and wireless sensors. These technologies offer varying levels of accuracy and precision and are used to obtain and track the position and orientation of the participant's or player's head to identify the location of their eyes (e.g., to allow the 3D content to be rendered from a proper point of view or perspective) and, in some cases, their hands or other body parts to allow them to interact with the physical and virtual components of the AR gaming environment.

Significantly, the system 100 is also configured to allow the two players 104, 105 to see each other during game play (operations of the system 100). To this end, the 3D display assembly 120 is adapted to provide a line of sight between the first player space 102 and the second player space 103, e.g., the assembly 120 includes one or more translucent-to-transparent components allowing light to pass. To facilitate viewing of other players, the system 100 includes a first light source 110 directing light 112 into the space 102 and onto the first player 104. This light 112 is reflected as shown at 114 from the first player 104, passes through (or at least a portion passes through) the 3D display assembly 120 for receipt by the second player 105 via the 3D eyewear 107 so as to allow the second player 105 to view the first player 104. Likewise, the system 100 includes a second light source 111 directing light 113 into the space 103 and onto the second player 105. This light 113 is reflected as shown at 115 from the second player 105, passes through (or at least a portion passes through) the 3D display assembly 120 for receipt by the first player 104 via the 3D eyewear 106 so as to allow the first player 104 to view the second player 104. The viewing of the other player 104 or 105 occurs concurrently with receipt of the displayed 3D content 124 or 125 via the 3D eyewear 106 or 107, respectively. In this manner, each of the players 104, 105 is able to perceive 3D gaming content that is rendered for their particular viewpoint and/or eye locations while also physically seeing or perceiving the other player, whereby it is unnecessary to render a likeness of a human player in the virtual gaming environment.

The system 100 includes a display controller 150 that functions to output first player generated 3D content 184 and second player generated 3D content 185, which is used by the 3D display assembly 120 to "concurrently" (which includes high frequency time multiplexing in this description) display the first and second player displayed content 124 and 125 viewable via the first and second sides 122, 123. To this end, the display controller 150 includes one or more CPUs and/or GPUs 152 that manage access and retrieval of data from memory 160 including data associated with a 3D video game/application 170. Further, the CPU/GPU 152 runs software (and/or uses hardware devices) to provide the functions of a game and display control module 154, a 3D content rendering engine 158, and a media server 180.

More specifically, the control module 154 may act to process the data from the trackers 116, 117 to determine the head or eye locations 162 of the first and second players 104, 105 within the spaces 102, 103. Based on these locations 162, the control module 154 further acts to set one or more parameters for a first set of virtual cameras (left and right eye cameras) used to generate 3D gaming content for the first player 104 and a second set of virtual cameras (left and right eye cameras) used to generate 3D gaming content for the second player 105. These camera parameters may include the location and viewpoint (or orientation) of each of the cameras. The system 100 also includes a 3D content rendering engine 158 that takes as input the virtual world/game content 170 and the virtual camera locations and settings 164 and provides as output a rendering 184 suited for the first player 104 and a rendering 185 suited for the second player 105, with the 3D content 184, 185 being served or delivered to the 3D display assembly 120 by the media server 180 for display as shown at 124, 125.

As discussed in the examples below of particular gaming applications, the game content 170 may include a game object 172 that virtually moves between the player spaces 102, 103. As the game object 172 moves in the virtual world, the rendering engine 158 uses the virtual camera locations/settings 164 and other game data (such as velocity, acceleration, and so on of the object 172) to correctly render the game object 172 from each player's viewpoint or perspective. For example, the game object 172 may have different sides and each player 104, 105 would view the side facing their present eye locations. The game object 172 may also be rendered by the engine 158 to decrease in size as it moves farther away from each player 104, 105 and to increase in size as it moves closer to the present location. The display controller 150 may also store game state data 176 such as the present score for the game being played, life/strength values for each player 104, 105, and so on, and the content 184, 185 may be rendered to include a representation of the game state that can be displayed to each player 104, 105 as another augmentation of the physical world.

The trackers 116, 117 may also be used to track a location/movement of a body part (such as the hand 108, 109) or a game element held/worn by each of the players 104, 105, and the game control module 154 may use this tracked data 162 to allow the players 104, 105 to interact with the gaming environment such as to hit or block the moving game object 172 and redirect it back to the other player 104 or 105. In this manner, the trackers 116, 117 may be thought of as user input devices (or components of a player input system) operable to allow the players 104, 105 to provide user input that can be processed by the game and display control module (or game software) 154 and, in response, to modify the rendered 3D content/imagery and/or to update the game state (e.g., to identify an unsuccessful interaction such as a missed ball, a dropped ball, a hit or miss by a thrown/activated weapon, and the like) as is known in conventional interactive video games.

FIGS. 2A and 2B illustrate, respectively, a first player's view 210 through their 3D eyewear during game play with an AR gaming system of the present description and a second player's view 240 (observed concurrently with view 210 by first player 220) through their 3D eyewear. As shown, the first player 220 in their view 210 is able to perceive displayed 3D content in the form of a net 212 and an approaching ball 216, which was hit by the second player 230 toward them in the virtual gaming environment. Also, the physical world viewed through their glasses 224 is augmented with gaming state data or statistics 214 such as the present score (with lettering being oriented to be readable or to be facing their player space and/or present location of their eyes). The first player 220 may try to move their hand 222 into position to strike the approaching ball 216 as seen in FIG. 2A, and the first player 220 is able to see both their physical hand 222 as well as its location/movement relative to the moving virtual game object/ball 216 through their 3D eyewear 224.

At the same point of game play (or same time), the second player 230 in their view 240 is able to perceive through their 3D eyewear 234 displayed 3D content in the form of a net 242 and a retreating ball 246, which they have recently hit toward the first player's space. Their view 240 also includes augmentation content 244 in the form of the current game score oriented properly for them to read based on their current eye locations. Significantly, the second player concurrently can see the first player 220 via their 3D eyewear 234 through a sight line in the 3D display assembly (positioned between them and the first player 220). As can be seen in FIGS. 2A and 2B, the game object/ball is displayed to be much larger in the first player's view 210 as shown at 216 than in the second player's view 240 as shown at 246, which corresponds with what the players would expect of an object moving closer and farther away from their present location in the virtual world. With this simple example, the operations of an AR gaming system of the present description can be understood to allow the players 220, 230 to see each other while they are also able to concurrently view displayed 3D content that is rendered to be specific to their present location (or their eye locations and/or viewpoints) relative to a 3D display assembly (not shown in FIGS. 2A and 2B).

There are numerous implementations of the AR gaming system 100 of FIG. 1 that may be used to provide 3D imagery specific to each player while also providing sight lines between the players, and each of these AR gaming systems may use differing 3D display assemblies (or different embodiments of the 3D display assembly 120 of FIG. 1).

Figure 3:
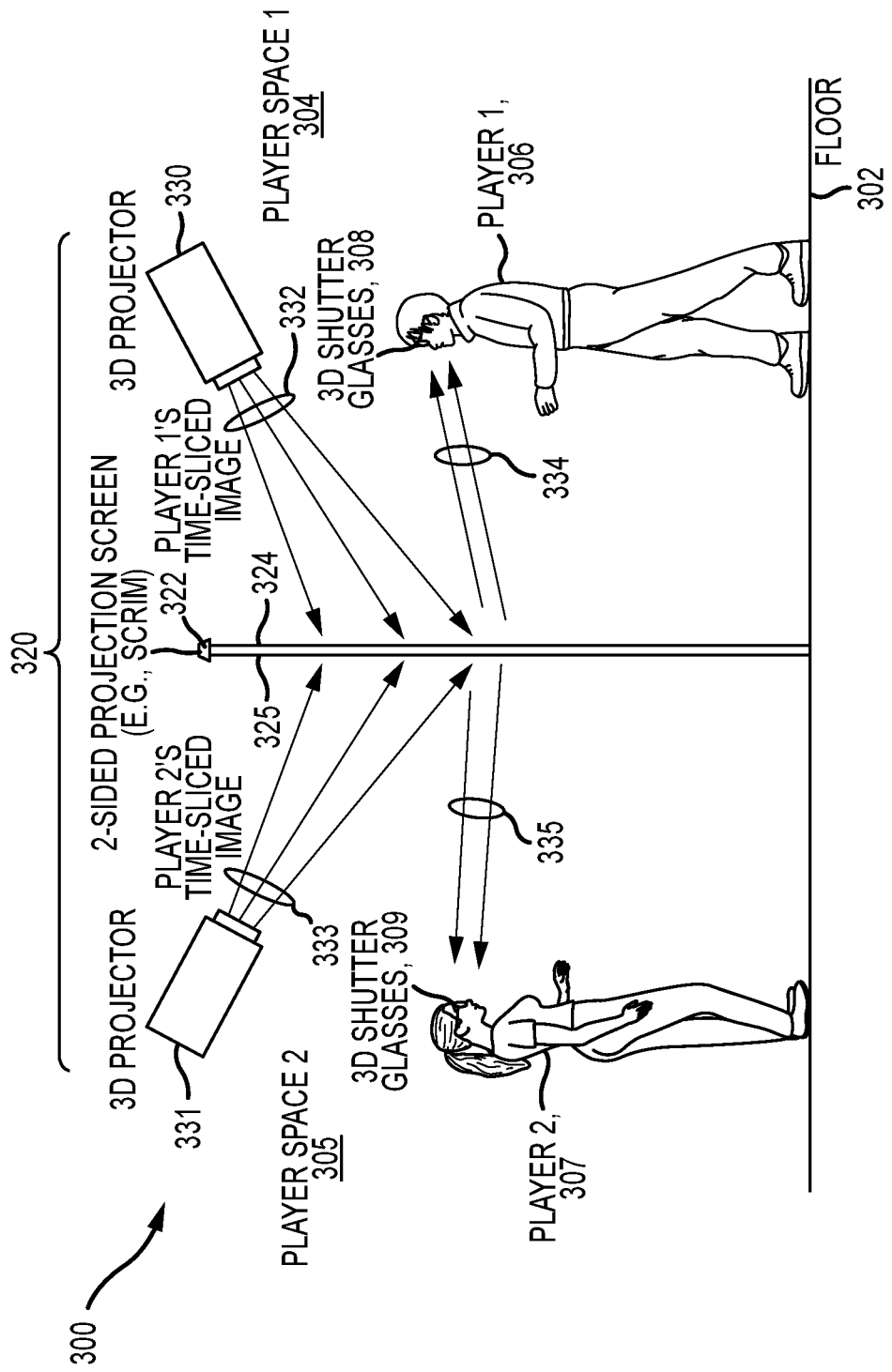
FIG. 3 is a side schematic illustration of an AR gaming system showing one embodiment for a 3D display assembly using time-sliced images (or time multiplexing) to provide unique 3D imagery to each player.

For example, FIG. 3 shows an AR gaming system 300 that makes use of time multiplexing (or time-sliced imagery) to deliver different 3D content to two game players 306 and 307. Although not shown in FIG. 3, the system 300 would further include tracking devices as discussed for system 100 as well as a display controller (such as controller 150) operable to generate and provide 3D content for each of the players 306, 307, e.g., in a time-sliced or multiplexed manner to 3D projectors 330, 331. These components are not shown but would be provided in system 300 and each of the following embodiments of AR gaming systems, and these components are not repeated to simplify the different approaches for implementing the 3D display assembly 120 of FIG. 1.

As shown in FIG. 3, the system 300 includes a gaming arena or space that is defined by a floor/platform 302 and two player spaces 304, 305 in which the two players 306, 307 are positioned so as to face toward each other. Time multiplexing is used to deliver the 3D content, and, with this in mind, each of the players 306, 307 wears a pair of 3D shutter glasses 308, 309 (i.e., to implement the 3D eyewear 106, 107 of FIG. 1). The system 300 further includes a 3D display assembly 320, which includes a 2-sided projection screen 322 that is positioned between the first and second player spaces 304, 305 with a first side 324 facing the first player 306 in the first player space 304 and with a second side 325 facing the second player 307 in the second player space 305. Typically, the 2-sided projection screen 322 is oriented to be orthogonal to the floor 302 and to be at an angle of about zero degrees relative to both spaces 304, 305.

The projection screen 322 is chosen to be substantially transparent to light so that the first player space 304 is visible from the second player space 305 and vice versa. This allows the players 306, 306 to be able to see each other during game play through the projection screen (such as when they are illuminated by light in the spaces 304, 305). To this end, the projection screen 322 may be formed of scrim material (or be a scrim) in some embodiments, which is translucent to transparent to light except when it is brightly illuminated such as with light 332, 333 from 3D projectors 330, 331. In other embodiments, a translucent liquid crystal display (LCD) film may be utilized as the screen 322. In another embodiment, a material, such as smart glass or polymer dispersed liquid crystal (PDLC) material, that can be electrically controlled is utilized for the screen and made transparent and translucent to opaque in a switching manner that is synchronized with the shutter glasses 308, 309 (and projectors 330, 333).

The 3D display assembly 320 also includes a first 3D projector 330 operating as shown to project light 332 providing 3D content (or Player 1's time-sliced images) onto the first surface/side 324 of the projection screen 322. This light is reflected as shown at 334 and received by the left and right eyes of the first player 306 via the lenses of the shutter glasses 308. The display assembly 320 includes a second 3D projector 331 operating as shown to project light 333 providing 3D content (or Player 2's time-sliced images) onto the second surface/side 325 of the projection screen 322. This light is reflected as shown at 335 and received by the left and right eyes of the second player 307 via the lenses of the shutter glasses 309. As discussed with reference to FIG. 1, the 3D content provided by each projector 330, 331 is specific to each of the players 306, 307 and their tracked location within the spaces 304, 305 (or relative to the projection screen 322).

The operations of the projectors 330, 331 are time synchronized (by a display controller or the like) with operations of the 3D shutter glasses 308, 309 as is known by those in the 3D projection arts so that no visual overlap occurs with time-sliced images 332, 333 of the other player 306 or 307. For example, both shutters of the glasses 309 are closed when light 332 is projected from 3D projector 330 onto the first side 324 of the screen 322 for viewing by the first player 306 as shown at 334. At the same time, the left or right shutter of glasses 308 will be open to allow the player 306 to receive their 3D content. Switching may involve delivery of the left eye images and then the right eye images to the first player 306 followed by delivery of the left eye images and then the right eye images to the second player 307 and so on during operations of the system 300. Switching may be rapid enough that one or more time periods in the switching cycle may involve operating the projectors 330, 331 to provide no projection or light (or little light) between delivery of 3D imagery 332, 333 so that the projection screen is periodically transparent (or more transparent) to enable the players 306, 307 to see each other through the screen 322 (e.g., LE1, RE1, LE2, RE2, No Projection, No Projection, and so on). When the screen 322 is an electrically controlled film, the screen 322 would be controlled to be transparent during the no projection time periods or time slices.

Figure 4:
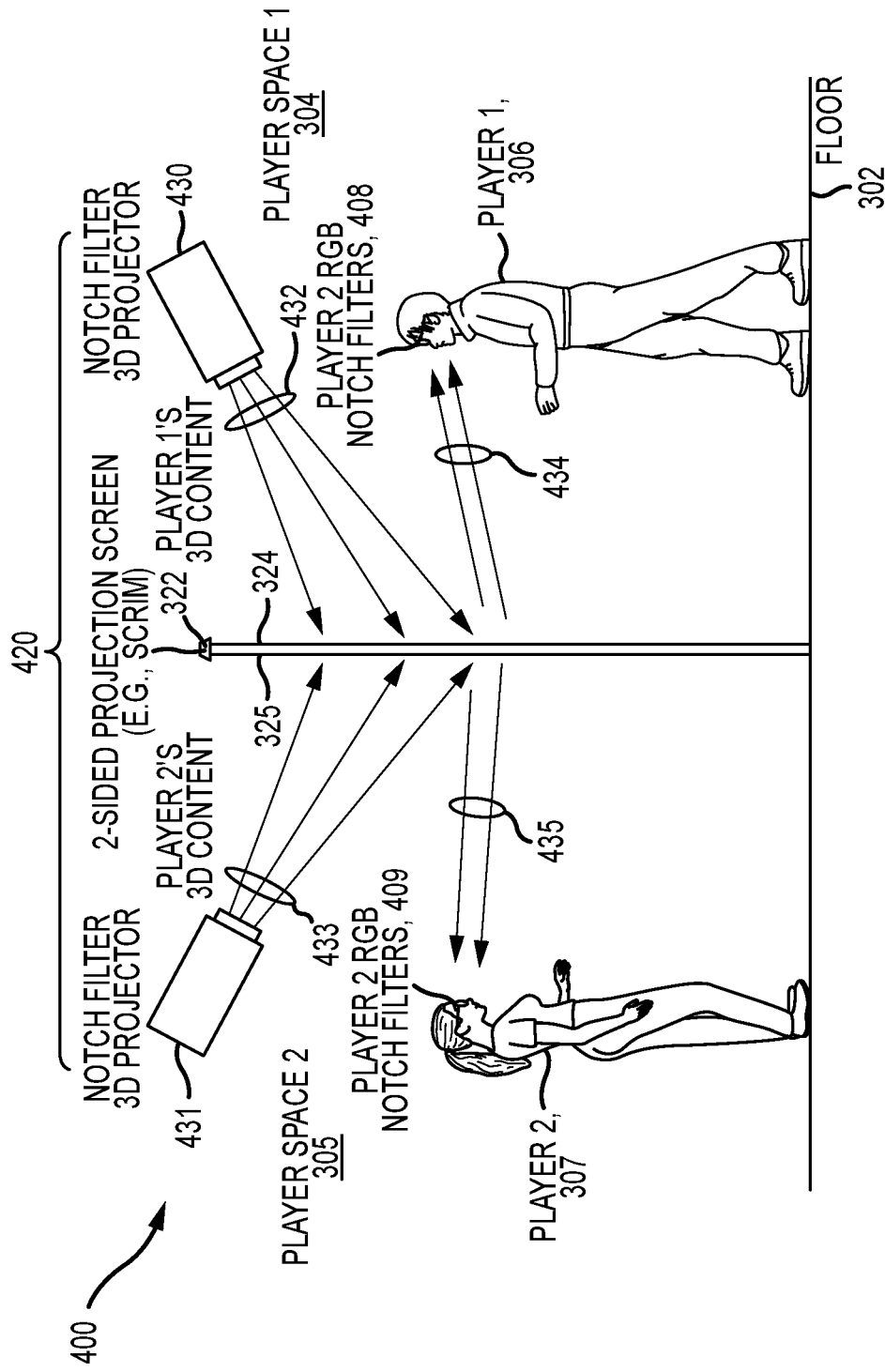
FIG. 4 is an illustration, similar to FIG. 3, of another AR gaming system showing an embodiment of a 3D display assembly using notch-filter technology to deliver different 3D content to each player.

FIG. 4 illustrates another exemplary AR gaming system 400 that includes components of system 300 of FIG. 3, which are identified with like reference numbers and not described further. In system 400, color notch-filter technology is used to deliver 3D content that is specific to each of the players 306, 307 (e.g., is generated based on their tracked location). As shown, each player 306, 307 wears a pair of 3D glasses 408, 409 that provides a pair of RGB notch filters over their left and right eyes that is unique (i.e., the filters differ for player 306 and for player 307). Similarly, in 3D display assembly 420, first and second notch filter 3D projectors 430, 431 are provided that deliver left and right eye light or 3D content 432, 433 that is reflected from the sides 324, 325 (as discussed above) as shown at 434, 435 for viewing by the players 306, 307 via the RGB notch filters of the 3D glasses 408, 409.

In system 400, 3D visual multiplexing is provided in part by each player 306, 307 wearing unique color notch-filter 3D glasses 408, 409. The glasses 408, 409 are adapted so that they only let through a specific wavelength of light for each color (red, green, and blue), and the projectors 430, 431 are designed to provide light 432, 433 at these wavelengths to provide left and right eye (or 3D) content. The first player 306 sees a slightly different version of RGB than his opponent (or the second player) 307. The first player's image 432, 434 gets projected by projector 430 only at his wavelength (e.g., the wavelengths of filters in glasses 408), which means that the color filters of the second player's glasses 409 prevent him from seeing the imagery projected by the first projector 430 on screen 322 (and vice versa). Hence, only the first player 306 wearing unique RGB notch filters of 3D eyewear 408 sees the viewport to the virtual gaming world/environment created by the system 400 for the first player 306 (and the second player 307 is the only one able to see the viewport created for them based on their tracked location).

Figure 5:
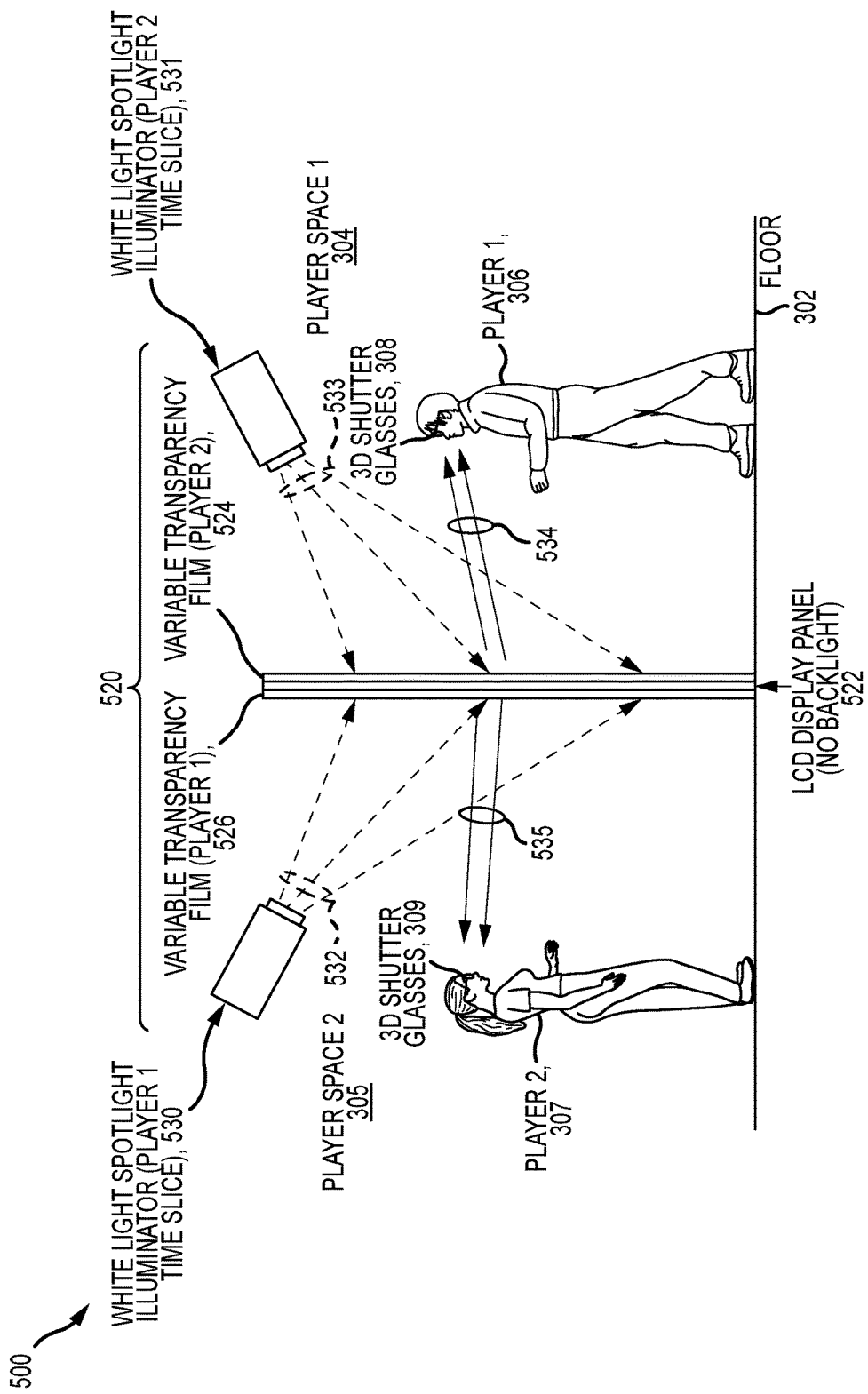
FIG. 5 is a side schematic, similar to FIG. 3, of an AR gaming system that uses time multiplexing, 3D shutter glasses, and a single unlit LCD display panel to provide player-specific 3D content to two or more players.

FIG. 5 is a side schematic of an AR gaming system 500 that uses time multiplexing, 3D shutter glasses 308, 309, and a single unlit LCD display panel to provide player-specific 3D content to two or more players 306, 307. In system 500, the display assembly 320 of the system 300 of FIG. 3 is replaced with the 3D display assembly 520. In assembly 520, the scrim-type screen 322 is replaced with an LCD display panel 522 that is unlit or has no backlight. The LCD display panel 522 is operated, by a display controller such as controller 150 in system 100 of FIG. 1, in a time-sliced or time multiplexing (or switched) manner to display 3D content (left and right eye imagery) that is visible as shown at 534, 535 by the two players 306, 307 via their 3D shutter glasses 308, 309. Periodically, no imagery is displayed so that the panel 522 is transparent to allow the players 306, 307 to see each other through the panel 522.

To provide backlighting of the LCD panel 522 in a time-sliced manner, a first variable transparency film 526 is provided on the side of the panel 522 in or facing the second player space 305 (or side opposite the first player space 304), and this film 526 is operated to become opaque (or translucent-to-opaque) when the LCD panel 522 is operating to display 3D content for the first player 306. Concurrently, an illuminator 530 (e.g., a white light spotlight illuminator) is operated to direct light 532 onto the film 526 to backlight the LCD display panel 522 and provide light/3D content 534 to the player 306 for viewing through their shutter glasses 308 (either the left eye or the right eye will receive the light 534). Operations of the shutter glasses 308, the LCD display panel 522, the film 526, and the illuminator 530 are synchronized to provide left and right eye content/light 534 to the player 306 (with the 3D content being generated to suit the player's tracked location in the space 304 as discussed above).

Similarly, in the display assembly 520, a second variable transparency film 524 is provided on the side of the panel 522 in or facing the first player space 304 (or side opposite the second player space 305), and this film 524 is operated to become opaque (or translucent-to-opaque) when the LCD panel 522 is operating to display 3D content for the second player 307. Concurrently, an illuminator 531 (e.g., a white light spotlight illuminator) is operated to direct light 533 onto the film 524 to backlight the LCD display panel 522 and provide light/3D content 535 to the player 307 for viewing through their shutter glasses 309 (either the left eye or the right eye will receive the light 534). Operations of the shutter glasses 309, the LCD display panel 522, the film 524, and the illuminator 531 are synchronized to provide left and right eye content/light 535 to the player 307 (with the 3D content being generated to suit the player's tracked location in the space 305 as discussed above).

In the system 500, player viewports to the virtual or gaming world (e.g., the 3D content generated so as to be specific to each player and their tracked location) are rendered on a single, large LCD display panel 522 with no backlight. On either side of the panel 522 are layers 524, 526 of variable translucency LCD or other film (e.g., PDLC film or the like). When turned on, these panels/films 524, 526 become light diffusers. On either side of the LCD display panel 522 are white-light spotlights 530, 531. During operations of the system 500 (or during game play), the LCD display panel 522 alternates rendering the first player's viewport 534 and then the second player's viewport 535. When a viewport should be visible for a player 306 or 307, the corresponding transparent film 526 or 524, respectively, is operated to become diffusely opaque, and the associated white light illuminator 530 or 531 is turned on (by a display controller such as controller 150 in FIG. 1, for example). The light/diffuser pairs become the backlight for the LCD display panel 522, and the player 306 or 307 sees the imagery 534 or 535 that is appropriate to their viewport.

Figure 6:
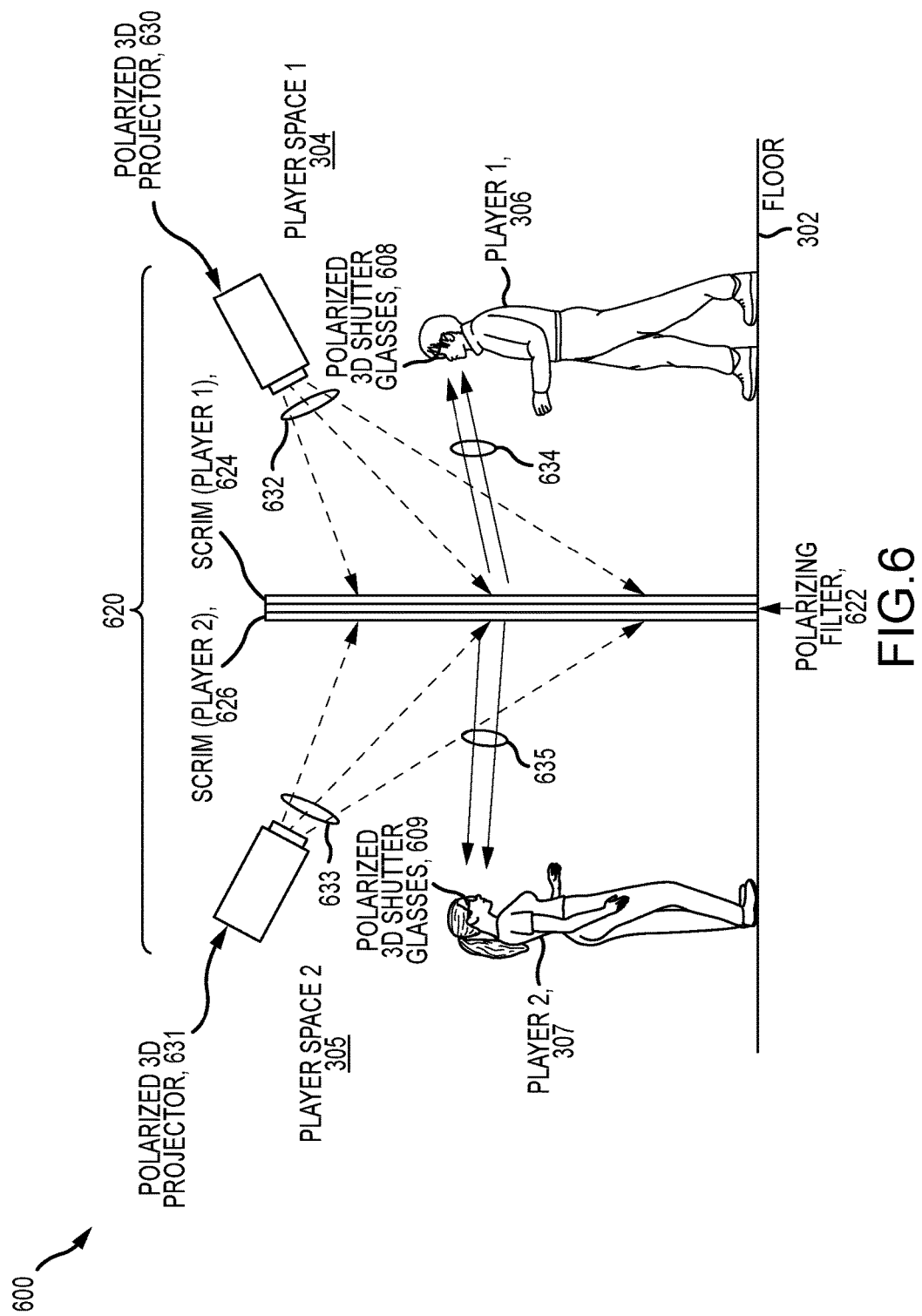

FIG. 6 illustrates another embodiment of an AR gaming system 600 that is designed specifically to defeat blow-by. Blow-by is light from one projector traveling through a scrim and potentially blinding or affecting imagery seen by a player on the opposite side of the scrim. As shown in FIG. 6, the 3D display assembly 620 is modified relative to assembly 520 to include a scrim 624, 626 for each of the player spaces 304 and 305, respectively (or for each player 306 and 307 when only two players are using the system 600). A polarizing filter or light polarizer sheet 622 is positioned or sandwiched between the scrims 624, 626 (with the sheet 622 typically taking the same size and shape as each of the scrims 624, 626). Each of the 3D projectors 630, 631 is configured to output each player's 3D content 632, 633 with a polarization (e.g., by positioning a polarizing filter in front of each projector's output/lens), and the shutter glasses 608, 609 are configured to receive light 634, 635 with such a polarization. The projector polarization is chosen to be the opposite of the polarization of the polarized sheet 622 between the scrims 624, 626. In this way, light 632, 633 from the projectors 630, 631 reflects off (as shown with arrows 634, 635) the appropriate scrim 624 or 626 but does not travel through the filter/sheet 622 (i.e., is filtered/blocked by the filter/sheet 622) to ruin the illusion on the other side of the 3D display assembly 620.

Figure 7:
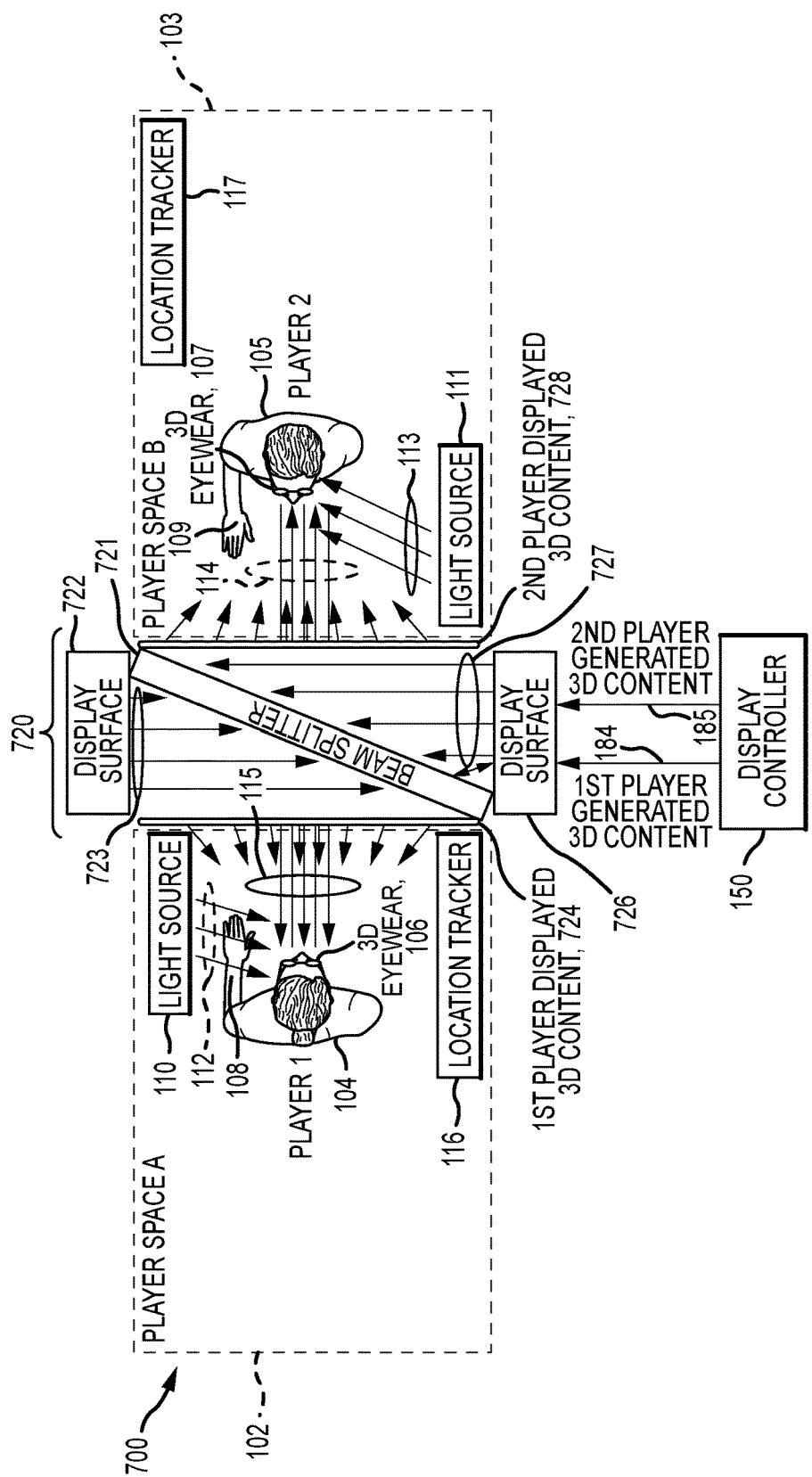
FIG. 7 is a functional block diagram similar to FIG. 1 showing an embodiment of the 3D display assembly that includes a beamsplitter to allow the players to see each other and also to see their 3D content for the 3D game or virtual world.

FIG. 7 shows an AR gaming system 700 that provides a specific implementation of the system 100 of FIG. 1 (with like components having matching reference numbers). In the system 700, the 3D display assembly 720 includes a beamsplitter 721 positioned at an angle, θ, between the two players spaces 102, 103 (e.g., at 45 degrees to a front plane or wall of each space 102, 103). A first display device or surface 722 is used to display the 3D content 723 generated for the first player 104, and this content/light is reflected from a first surface/side of the beamsplitter 721 as shown with arrows 724 to be directed into the first space 102 for viewing by the first player 104 via 3D eyewear 106 (e.g., 3D shutter glasses when the display device 722 is operated to display left and right eye content in a time-sliced manner).

A second display device or surface 726 is used to display the 3D content 727 generated for the second player 105, and this content/light is reflected from a first surface/side of the beamsplitter 721 as shown with arrows 728 to be directed into the second player space 103 for viewing by the second player 105 via 3D eyewear 107 (e.g., 3D shutter glasses when the display device 726 is operated to display left and right eye content in a time-sliced manner). Concurrently, the players 104 and 105 are able to see each other through the beamsplitter 721 as discussed with reference to FIG. 1 and as shown by arrows 114 and 115.

In the system 700, the beamsplitter 721 can be relatively large to stretch from the floor to or toward the ceiling of the space, and it may take the form of a planar film of a material that is both reflective and transparent such as a polyester (e.g., BoPET (Biaxially-oriented polyethylene terephthalate) commonly known as Mylar™). The beamsplitter 721 separates the opposing players, and the beamsplitter 721 allows the players 104, 105 to look directly at each other. Each side of the beamsplitter 721 reflects an image from a different display surface/element 722, 726, which are operated to display or project light associated with content rendered to be specific to each player (provide a view of the gaming environment/virtual world from the player's tracked location).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

From the above description, it will be understood that with the concepts of the AR gaming system understood many complex and exciting virtual games become possible and can be provided by operation of the AR gaming system. Because virtual objects do not need to obey the laws of physics, they can take many forms and behave in unpredictable and stimulating ways. For example, the players could battle in an AR environment such as by throwing objects (e.g., weapons from a popular movie or animation) back and forth at each other. These objects may behave as similar objects in the movies or animations including bouncing off real or virtual surfaces, splitting into pieces, dodging real or virtual obstacles, and changing direction unexpectedly. To increase the believability of the AR world, the virtual objects may be used by the game controller or game software to trigger audio and/or haptic feedback devices in the possession of and/or specific to each player.

The new AR gaming system provides a number of useful advantages. The system really puts the players in the virtual world with real time updating of 3D imagery that is specific to each player and their present location and with concurrent viewing of the surrounding physical set or area including the other game players. In contrast, VR systems have latency, networking, and rendering issues when attempting to realistically display complex 3D objects such as human players. Prior systems that rely solely on AR glasses have similar challenges and have yet to overcome the problem of narrow fields of view. Because VR headsets block the player's view of the real world entirely, there would be safety concerns in trying to duplicate the games that are enabled by the new AR gaming system using VR technology. Additionally, the heavier VR and AR headsets are more likely to fall off a player's head during physical action games provided with the new AR gaming system than lighter 3D eyewear (such as 3D shutter glasses or the like) used herein to provide 3D imagery to game players.

In some embodiments of the system 100, audio output devices (e.g., speakers, headphones, earbuds, or the like) are provided in each player space 102, 103 and/or for each player 104, 105 to provide spatial audio selectively triggered by the display controller 150, and the audio tracks played by the display controller 150 are adapted to allow the players 104, 105 to each hear the objects coming towards them. In other words, the audio playback is also modified during game play to be specific to each player 104, 105 and/or to each player space 102, 103.

In these or other embodiments, the system 100 is further configured to provide haptics to enhance the game player's experience during AR gaming/activities. For example, each player may wear or hold a haptic device that is caused to vibrate or otherwise function to provide the player with feedback such as when they are contacted by an object in the 3D content generated by that player. This may involve a player 104, 105 wearing one or more haptic gloves and when an object (such as a ball) in the 3D content (in the AR gaming environment) hits their hand 108, 109 the haptic glove vibrates. The display controller 150 may be configured (such as via a routine in the game and display control module 154) to monitor the 3D content 184, 185 along with the tracked location of the glove (player's hand 108 or 109) to determine when in the virtual world/game context 170 the moving game object 172 comes into contact with the player's hand 108 or 109 and, in response, to trigger the haptic function of the glove (e.g., vibration or the like).

From the above description, it should be clear that the systems (such as system 100) support more than a single player per side. When two players are in a particular player space (such as space 102 or 103 in FIG. 1). Each player (in the TDMA implementation) would get his or her own time slice. Similarly, while only one game object (such as a 3D ball or the like) is described as moving between player spaces (such as between spaces 102 and 103 in FIG. 1), one skilled in the arts will understand that the system could operate to provide one-to-many objects bouncing back and forth or moving about independently or in a coordinated way, and each of the objects may be similar in configuration or differ (e.g., differ in size, shape, and movement parameters in game play (e.g., be a light or heavy object, be a slow or fast moving object, be an object that follows a straight or a non-linear path, and so on)).

In the system 100, each of the players 104, 105 may use their hands 108, 109 (or other body parts) to interact with the 3D gaming environment and movement and/or location of these body parts is tracked by the system 100 for use in generating the 3D content 184, 185 served for display to each player 104, 105. In addition, each player 104, 105 may use a toy or "tool" (e.g., a game controller) to interact with the 3D environment, and its location and/or operations (e.g., pressing buttons, moving a stylus/mouse, touching a screen, operating a trigger, and so on) would be monitored by the display controller 150 for use by the game and display control module 154 in generating the 3D content 184, 185 to suit each player's positioning and/or operation of their toy, tool, or controller. For example, if the game 170 implemented by the system 100 were a paintball game, the system 100 would recognize the paint ball gun held and aimed by each of the players 104, 105 and make the ball (e.g., a moving 3D object 172 in the game/world context 170) emit from the gun barrel (be included and move in the generated 3D content 184, 185 as appropriate (e.g., with proper timing to match a triggering operation and to follow a target/travel line extending linearly out from the toy)).

The system 100 may also be adapted to provide immersion into the 3D world/game environment. For example, "show sets" can be incorporated into the different player areas 102, 103 to increase immersion. In some cases, video BG layers may be provided behind each player 104, 105 in or near the player spaces 102, 103. For instance in the paintball game example, a first player 104 shoots a paintball from their toy paintball gun and misses the second player 105, and the first player's 3D content 184 is configured so that they now see their paintball splat against the wall behind the other player 105.

Another embodiment of the system 100 would include more than two player spaces 102, 103 (and more players 104, 105). For example, a 3-player space game/environment may be provided by modifying system 100 to support a 3-chambered game, where the projection walls look like the propellers in a three-bladed boat motor (e.g., three walls dividing the inner space of a circle into three equal spaces or the like). The display controller 150 is configured in such an embodiment to track the player or players in the third space as discussed above and to display 3D content generated for their tracked location and actions (along with the other two players), and the player or players in the third space can see both of the other player spaces and players therein (and vice versa) concurrently with viewing of their particular 3D content.

We claim:

1. A system for providing an augmented reality (AR) experience for two or more participants, comprising:
    a first player space;
    a second player space;
    first three dimensional (3D) eyewear wearable by a first participant in the first player space;
    second 3D eyewear wearable by a second participant in the second player space;
    a 3D display assembly positioned between the first and second player spaces,
    wherein light from the second player space passes through the 3D display assembly and the first 3D eyewear whereby the first participant is able to view the second participant,
    wherein light from the first player space passes through the 3D display assembly and the second 3D eyewear whereby the second participant is able to view the first participant,
    wherein the 3D display assembly projects 3D content generated for the first participant from a first side into the first player space and projects 3D content generated for the second participant from a second side into the second player space, and
    wherein the 3D display assembly comprises:
        a projection screen positioned between the first and second player spaces with a first side facing the first player space and a second side facing the second player space;
        a first 3D projector projecting the 3D content generated for the first participant upon the first side of the projection screen; and
        a second 3D projector projecting the 3D content generated for the second participant upon the second side of the projection screen,
        wherein the first and second 3D eyewear each comprises 3D shutter glasses and
        wherein the first and second 3D projectors are operated with time multiplexing relative to each other and to alternate between displaying left and right eye images and with synchronized operations with the 3D shutter glasses to deliver the left and right eye images to left and right eyes of the first and second participants.

2. The system of claim 1, further comprising a display controller, a first tracking mechanism, and a second tracking mechanism, wherein the first tracking mechanism collects location information for the first participant in the first space and the second tracking mechanism collects location information for the second participant in the second space and wherein the display controller generates the 3D content generated for the first participant based on the collected location information for the first participant and generates the 3D content generated for the second participant based on the collected location information for the second participant.

3. The system of claim 2, wherein the display controller processes the collected location information to determine eye locations for the first and second participants and wherein the 3D content is generated by placing virtual cameras for rendering at the determined eye locations.

4. The system of claim 2, wherein the display controller generates and plays via an audio output system differing audio tracks for each of the first and second participants corresponding to the 3D content generated for the first and second participants, whereby the first and second participants hear virtual objects moving relative to their locations in the first and second player spaces.

5. The display system of claim 2, further including a haptic device for each of the first and second participants that is operable by the display controller when a moving object in the 3D content generated for the first and second participants is determined to contact one of the haptic device.

6. The system of claim 1, wherein the 3D content generated for the first participant differs from the 3D content generated for the second participant and wherein the 3D content generated for the first and second participants includes an object appearing to move between the first and second player spaces.

7. The system of claim 1, wherein the projection screen comprises a scrim or a variable translucency LCD film.

8. The system of claim 1, wherein the projection screen comprises a first scrim proximate to the first player space, a second scrim proximate to the second player space, and a light polarization sheet with a first polarization sandwiched between the first and second scrims and wherein the first and second 3D projectors each further includes a polarizing filter in front of an output whereby light from the output has a second polarization opposite to the first polarization.

9. A system for providing an augmented reality (AR) experience for two or more participants, comprising:
    a first player space;
    a second player space;
    first three dimensional (3D) eyewear wearable by a first participant in the first player space;
    second 3D eyewear wearable by a second participant in the second player space;
    a 3D display assembly positioned between the first and second player spaces, wherein light from the second player space passes through the 3D display assembly and the first 3D eyewear whereby the first participant is able to view the second participant, wherein light from the first player space passes through the 3D display assembly and the second 3D eyewear whereby the second participant is able to view the first participant, wherein the 3D display assembly projects 3D content generated for the first participant from a first side into the first player space and projects 3D content generated for the second participant from a second side into the second player space, and wherein the 3D display assembly comprises:
  a projection screen positioned between the first and second player spaces with a first side facing the first player space and a second side facing the second player space;
  a first notch filter 3D projector projecting the 3D content generated for the first participant upon the first side of the projection screen; and
  a second notch filter 3D projector projecting the 3D content generated for the second participant upon the second side of the projection screen,
  wherein the first and second 3D eyewear each comprises RGB notch filters corresponding to output light from the first and second notch filter 3D projectors, respectively.

10. A system for providing an augmented reality (AR) experience for two or more participants, comprising:
a first player space;
a second player space;
first three dimensional (3D) eyewear wearable by a first participant in the first player space;
second 3D eyewear wearable by a second participant in the second player space;
a 3D display assembly positioned between the first and second player spaces,
wherein light from the second player space passes through the 3D display assembly and the first 3D eyewear whereby the first participant is able to view the second participant,
wherein light from the first player space passes through the 3D display assembly and the second 3D eyewear whereby the second participant is able to view the first participant,
wherein the 3D display assembly projects 3D content generated for the first participant from a first side into the first player space and projects 3D content generated for the second participant from a second side into the second player space, and
wherein the 3D display assembly comprises:
  a projection screen positioned between the first and second player spaces with a first side facing the first player space and a second side facing the second player space, wherein the projection screen comprises an LCD display panel without a backlight sandwiched between first and second variable transparency films providing the first and second sides, respectively;
  a first illuminator projecting white light onto the second side of the projection screen when the 3D content generated for the first participant is being displayed on the LCD display panel and the second variable transparency film is operated to be translucent-to-opaque; and
  a second illuminator projecting white light onto the first side of the projection screen when the 3D content generated for the second participant is being displayed on the LCD display panel and the first variable transparency film is operated to be translucent-to-opaque;
  wherein the first and second 3D eyewear each comprises 3D shutter glasses and
  wherein the first and second illuminators are operated with time multiplexing relative to each other and with synchronized operations with the 3D shutter glasses to deliver left and right eye images to left and right eyes of the first and second participants.

11. A system for providing an augmented reality (AR) experience for two or more participants, comprising:
a first player space;
a second player space;
first three dimensional (3D) eyewear wearable by a first participant in the first player space;
second 3D eyewear wearable by a second participant in the second player space;
a 3D display assembly positioned between the first and second player spaces,
wherein light from the second player space passes through the 3D display assembly and the first 3D eyewear whereby the first participant is able to view the second participant,
wherein light from the first player space passes through the 3D display assembly and the second 3D eyewear whereby the second participant is able to view the first participant,
wherein the 3D display assembly projects 3D content generated for the first participant from a first side into the first player space and projects 3D content generated for the second participant from a second side into the second player space, and
wherein the 3D display assembly comprises:
  a beamsplitter positioned at an angle between the first and second player spaces with a first side facing the first player space and a second side facing the second player space;
  a first display surface displaying the 3D content generated for the first participant upon the first side of the beamsplitter; and
  a second display surface displaying the 3D content generated for the second participant upon the second side of the beamsplitter.

12. A system for providing an augmented reality (AR) experience, comprising:
first three dimensional (3D) eyewear wearable by a first participant;
second 3D eyewear wearable by a second participant; and
a 3D display assembly,
wherein the 3D display assembly is configured to provide lines of sight between the first and second participants,
wherein the 3D display assembly projects 3D content generated for the first participant from a first side into the first player space and projects 3D content generated for the second participant from a second side into the second player space, and
wherein the 3D display assembly comprises:
  a projection screen positioned between the first and second participants with a first side facing the first participant and a second side facing the second participant;

a first 3D projector projecting the 3D content generated for the first participant upon the first side of the projection screen; and a second 3D projector projecting the 3D content generated for the second participant upon the second side of the projection screen, wherein the participants wear 3D shutter glasses and wherein the first and second 3D projectors are operated with time multiplexing relative to each other and to alternate between displaying left and right eye images and with synchronized operations with the 3D shutter glasses to deliver the left and right eye images to left and right eyes of the first and second participants.

13. The system of claim 12, further comprising a display controller, a first tracking mechanism, and a second tracking mechanism, wherein the first tracking mechanism collects location information for the first participant in the first space and the second tracking mechanism collects location information for the second participant in the second space and wherein the display controller generates the 3D content generated for the first participant based on the collected location information for the first participant and generates the 3D content generated for the second participant based on the collected location information for the second participant.

14. The system of claim 12, wherein the projection screen comprises a scrim or a variable translucency LCD film.

15. The system of claim 12, wherein the projection screen comprises a first scrim, a second scrim, and a light polarization sheet with a first polarization sandwiched between the first and second scrims and wherein the first and second 3D projectors each further includes a polarizing filter in front of an output whereby light from the output has a second polarization opposite to the first polarization.

16. A system for providing an augmented reality (AR) experience, comprising:

first three dimensional (3D) eyewear wearable by a first participant;

second 3D eyewear wearable by a second participant; and a 3D display assembly, wherein the 3D display assembly is configured to provide lines of sight between the first and second participants, wherein the 3D display assembly projects 3D content generated for the first participant from a first side into the first player space and projects 3D content generated for the second participant from a second side into the second player space, and wherein the 3D display assembly comprises:

a projection screen positioned between the first and second participants with a first side facing the first participant and a second side facing the second participant;

a first notch filter 3D projector projecting the 3D content generated for the first participant upon the first side of the projection screen; and a second notch filter 3D projector projecting the 3D content generated for the second participant upon the second side of the projection screen, wherein the first and second participants wear RGB notch filters corresponding to output light from the first and second notch filter 3D projectors, respectively.

17. A system for providing an augmented reality (AR) experience, comprising:

first three dimensional (3D) eyewear wearable by a first participant;

second 3D eyewear wearable by a second participant; and a 3D display assembly, wherein the 3D display assembly is configured to provide lines of sight between the first and second participants, wherein the 3D display assembly projects 3D content generated for the first participant from a first side into the first player space and projects 3D content generated for the second participant from a second side into the second player space, and wherein the 3D display assembly comprises:

a projection screen positioned between the first and second participants with a first side facing the first participant and a second side facing the second participant, wherein the projection screen comprises an LCD display panel without a backlight sandwiched between first and second variable transparency films providing the first and second sides, respectively;

a first illuminator projecting white light onto the second side of the projection screen when the 3D content generated for the first participant is being displayed on the LCD display panel and the second variable transparency film is operated to be translucent-to-opaque; and a second illuminator projecting white light onto the first side of the projection screen when the 3D content generated for the second participant is being displayed on the LCD display panel and the first variable transparency film is operated to be translucent-to-opaque;

wherein the first and second 3D eyewear each comprises 3D shutter glasses and wherein the first and second illuminators are operated with time multiplexing relative to each other and with synchronized operations with the 3D shutter glasses to deliver left and right eye images to left and right eyes of the first and second participants.

18. A system for providing an augmented reality (AR) experience, comprising:

first three dimensional (3D) eyewear wearable by a first participant;

second 3D eyewear wearable by a second participant; and a 3D display assembly, wherein the 3D display assembly is configured to provide lines of sight between the first and second participants, wherein the 3D display assembly projects 3D content generated for the first participant from a first side into the first player space and projects 3D content generated for the second participant from a second side into the second player space, and wherein the 3D display assembly comprises:

a beamsplitter positioned at an angle between the first and second participants with a first side facing the first participant and a second side facing the second participant;

a first display surface displaying the 3D content generated for the first participant upon the first side of the beamsplitter; and a second display surface displaying the 3D content generated for the second participant upon the second side of the beamsplitter.

19. The system of claim 9, further comprising a display controller, a first tracking mechanism, and a second tracking mechanism, wherein the first tracking mechanism collects location information for the first participant in the first space and the second tracking mechanism collects location information for the second participant in the second space and wherein the display controller generates the 3D content generated for the first participant based on the collected location information for the first participant and generates the 3D content generated for the second participant based on the collected location information for the second participant.

20. The system of claim 19, wherein the display controller processes the collected location information to determine eye locations for the first and second participants and wherein the 3D content is generated by placing virtual cameras for rendering at the determined eye locations.

21. The system of claim 19, wherein the display controller generates and plays via an audio output system differing audio tracks for each of the first and second participants corresponding to the 3D content generated for the first and second participants, whereby the first and second participants hear virtual objects moving relative to their locations in the first and second player spaces.

22. The display system of claim 19, further including a haptic device for each of the first and second participants that is operable by the display controller when a moving object in the 3D content generated for the first and second participants is determined to contact one of the haptic device.

23. The system of claim 9, wherein the 3D content generated for the first participant differs from the 3D content generated for the second participant and wherein the 3D content generated for the first and second participants includes an object appearing to move between the first and second player spaces.

24. The system of claim 10, further comprising a display controller, a first tracking mechanism, and a second tracking mechanism, wherein the first tracking mechanism collects location information for the first participant in the first space and the second tracking mechanism collects location information for the second participant in the second space and wherein the display controller generates the 3D content generated for the first participant based on the collected location information for the first participant and generates the 3D content generated for the second participant based on the collected location information for the second participant.

25. The system of claim 24, wherein the display controller processes the collected location information to determine eye locations for the first and second participants and wherein the 3D content is generated by placing virtual cameras for rendering at the determined eye locations.

26. The system of claim 24, wherein the display controller generates and plays via an audio output system differing audio tracks for each of the first and second participants corresponding to the 3D content generated for the first and second participants, whereby the first and second participants hear virtual objects moving relative to their locations in the first and second player spaces.

27. The display system of claim 24, further including a haptic device for each of the first and second participants that is operable by the display controller when a moving object in the 3D content generated for the first and second participants is determined to contact one of the haptic device.

28. The system of claim 10, wherein the 3D content generated for the first participant differs from the 3D content generated for the second participant and wherein the 3D content generated for the first and second participants includes an object appearing to move between the first and second player spaces.

29. The system of claim 11, further comprising a display controller, a first tracking mechanism, and a second tracking mechanism, wherein the first tracking mechanism collects location information for the first participant in the first space and the second tracking mechanism collects location information for the second participant in the second space and wherein the display controller generates the 3D content generated for the first participant based on the collected location information for the first participant and generates the 3D content generated for the second participant based on the collected location information for the second participant.

30. The system of claim 29, wherein the display controller processes the collected location information to determine eye locations for the first and second participants and wherein the 3D content is generated by placing virtual cameras for rendering at the determined eye locations.

31. The system of claim 29, wherein the display controller generates and plays via an audio output system differing audio tracks for each of the first and second participants corresponding to the 3D content generated for the first and second participants, whereby the first and second participants hear virtual objects moving relative to their locations in the first and second player spaces.

32. The display system of claim 29, further including a haptic device for each of the first and second participants that is operable by the display controller when a moving object in the 3D content generated for the first and second participants is determined to contact one of the haptic device.

33. The system of claim 11, wherein the 3D content generated for the first participant differs from the 3D content generated for the second participant and wherein the 3D content generated for the first and second participants includes an object appearing to move between the first and second player spaces.

34. The system of claim 16, further comprising a display controller, a first tracking mechanism, and a second tracking mechanism, wherein the first tracking mechanism collects location information for the first participant in the first space and the second tracking mechanism collects location information for the second participant in the second space and wherein the display controller generates the 3D content generated for the first participant based on the collected location information for the first participant and generates the 3D content generated for the second participant based on the collected location information for the second participant.

35. The system of claim 17, further comprising a display controller, a first tracking mechanism, and a second tracking mechanism, wherein the first tracking mechanism collects location information for the first participant in the first space and the second tracking mechanism collects location information for the second participant in the second space and wherein the display controller generates the 3D content generated for the first participant based on the collected location information for the first participant and generates the 3D content generated for the second participant based on the collected location information for the second participant.

36. The system of claim 18, further comprising a display controller, a first tracking mechanism, and a second tracking mechanism, wherein the first tracking mechanism collects location information for the first participant in the first space and the second tracking mechanism collects location information for the second participant in the second space and wherein the display controller generates the 3D content generated for the first participant based on the collected location information for the first participant and generates the 3D content generated for the second participant based on the collected location information for the second participant.

* * * * *